(12) United States Patent
Walters et al.

(10) Patent No.: US 10,504,013 B1
(45) Date of Patent: Dec. 10, 2019

(54) COLORSPACE ENCODING MULTIMEDIA DATA ON A PHYSICAL PAGE

(71) Applicant: Capital One Services, LLC, McLean, VA (US)

(72) Inventors: Austin Grant Walters, Savoy, IL (US); Jeremy Edward Goodsitt, Champaign, IL (US); Fardin Abdi Taghi Abad, Champaign, IL (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/393,919

(22) Filed: Apr. 24, 2019

(51) Int. Cl.
*G06K 15/00* (2006.01)
*G06K 15/02* (2006.01)

(52) U.S. Cl.
CPC . *G06K 15/1886* (2013.01); *G06K 2215/0017* (2013.01)

(58) Field of Classification Search
None
See application file for complete search history.

(56) References Cited

U.S. PATENT DOCUMENTS

| | | | |
|---|---|---|---|
| 5,678,033 A | 10/1997 | Moledina et al. | |
| 5,724,450 A * | 3/1998 | Chen | H04N 1/6058 358/1.15 |
| 6,711,291 B1 | 3/2004 | Stubler et al. | |
| 6,831,682 B1 | 12/2004 | Silverbrook et al. | |
| 7,273,175 B2 | 9/2007 | Zhao et al. | |
| 8,405,780 B1 | 3/2013 | Schaem | |
| 9,805,296 B2 | 10/2017 | Loy et al. | |

(Continued)

FOREIGN PATENT DOCUMENTS

| | | | |
|---|---|---|---|
| CN | 104899630 A | 9/2015 | |
| CN | 106447590 A | 2/2017 | |

(Continued)

OTHER PUBLICATIONS

Walters, Austin G., "Edge Detection in Computer Vision", Metacortex Inc. [online] Feb. 17, 2015 [retrieved on Mar. 18, 2019]. Retrieved from Internet URL: https://austingwalters.com/edge-detection-in-computer-vision/, 22 pages.

(Continued)

*Primary Examiner* — Thomas D Lee

(57) ABSTRACT

Techniques to improve storage of information, including encoding of multimedia data on physical pages. Some techniques include logic configured to encode multimedia data pursuant to a colorspace scheme and on a piece of paper. The logic may further be configured to generate one or more colorspaces associated with the multimedia data, perform colorspace conversions based on the generated colorspaces, and encode the multimedia data pursuant to the colorspace conversions. The logic may be further configured to apply one or both of an ultraviolet layer and an infrared layer to the physical page, e.g. paper, in order to further enhance security and provide an additional vehicle for storing and encoding data on the physical page, e.g. paper. The logic may further be configured to provide a scanning device with the ability to scan and decode the encoded data one the sheet of paper. Other embodiments are described and claimed.

18 Claims, 11 Drawing Sheets

(56) References Cited

U.S. PATENT DOCUMENTS

| | | |
|---|---|---|
| 2002/0126328 A1 | 9/2002 | Lehmeier et al. |
| 2003/0053706 A1 | 3/2003 | Hong et al. |
| 2004/0197021 A1 | 10/2004 | Huang et al. |
| 2005/0006472 A1 | 1/2005 | Verschuur et al. |
| 2007/0046956 A1 | 3/2007 | Burlingame |
| 2007/0084933 A1 | 4/2007 | Zhang et al. |
| 2007/0229531 A1 | 10/2007 | Park et al. |
| 2008/0261687 A1 | 10/2008 | Gatzios |
| 2008/0284793 A1 | 11/2008 | Young |
| 2009/0028382 A1 | 1/2009 | Erol |
| 2010/0034380 A1 | 2/2010 | Lee |
| 2011/0186625 A1 | 8/2011 | Mangione-Smith |
| 2011/0233284 A1 | 9/2011 | Howard |
| 2012/0075484 A1 | 3/2012 | Kawamoto et al. |
| 2012/0176409 A1 | 7/2012 | Noge |
| 2012/0329553 A1 | 12/2012 | Gagner et al. |
| 2013/0026241 A1 | 1/2013 | Sakahashi et al. |
| 2013/0343645 A1 | 12/2013 | Dalal et al. |
| 2014/0119645 A1 | 5/2014 | Zimet-Rubner et al. |
| 2014/0119647 A1 | 5/2014 | Cheong et al. |
| 2015/0104184 A1 | 4/2015 | Jeffrey |
| 2015/0243200 A1 | 8/2015 | Pan |
| 2015/0294460 A1 | 10/2015 | Satish et al. |
| 2017/0061584 A1 | 3/2017 | Lim et al. |
| 2017/0076127 A1 | 3/2017 | Arce et al. |
| 2017/0309104 A1 | 10/2017 | Lewis et al. |
| 2017/0316297 A1 | 11/2017 | Lee |
| 2019/0066338 A1 | 2/2019 | Perlman et al. |
| 2019/0122440 A1 | 4/2019 | Barros et al. |

FOREIGN PATENT DOCUMENTS

| | | |
|---|---|---|
| JP | 2012141729 A | 7/2012 |
| JP | 2012181591 A | 9/2012 |
| KR | 101445502 B1 | 9/2014 |
| KR | 101573655 B1 | 12/2015 |
| KR | 20170038468 A | 4/2017 |
| WO | 2016111823 A2 | 7/2016 |
| WO | 2016170041 A1 | 10/2016 |

OTHER PUBLICATIONS

Walters, Austin G., "ChromaTags: An Accurate, Robust, and Fast Visual Fiducial System", [online] May 15, 2015 [retrieved on Mar. 18, 2019]. Retrieved from Internet URL: https://austingwalters.com/chromatags/, 13 pages.

Author Unknown., "ChromaTags", GitHub, Inc. [online] 2018 [retrieved on Mar. 18, 2019]. Retrieved from Internet URL: https://github.com/lettergram/chromatag, 3 pages.

Author Unknown., "ChromaTag: A Colored Marker and Fast Detection Algorithm", GitHub, Inc. [online] 2018 [retrieved on Mar. 18, 2019]. Retrieved from Internet URL: https://github.com/CogChameleon/ChromaTag, 3 pages.

Author Unknown., "H.264 is Magic", SidBala [online] Nov. 2, 2016 [retrieved on Mar. 18, 2019]. Retrieved from Internet URL: https://sidbala.com/h-264-is-magic/, 20 pages.

DeGol et al., "Chroma Tag: A Colored Marker and Fast Detection Algorithm", 2017 IEEE International Conference on Computer Vision, pp. 1481-1490, IEEE Computer Society, 2017.

* cited by examiner

500

- RECEIVE A MULTIMEDIA DATA SET
  *502*

- COMPRESS THE RECEIVED MULTIMEDIA DATA SET INTO A COMPRESSED DATA-PACKET
  *504*

- ENCODE THE COMPRESSED DATA-PACKET ON ONE OR MORE PAGES ACCORDING TO A COLOR-SPACE
  *506*

- INSTRUCT A PRINTING DEVICE TO PRINT THE ONE OR MORE PAGES ON ONE OR MORE PHYSICAL PAGES
  *508*

SCAN ONE OR MORE PHYSICAL PAGES CONTAINING COMPRESSED DATA, WHERE THE COMPRESSED DATA IS ENCODED ON THE ONE OR MORE PHYSICAL PAGES PURSUANT TO A COLOR-SPACE

*615*

DECODING THE COMPRESSED DATA, WHEREIN THE DECODING IS PURSUANT TO THE COLOR-SPACE

SCANNING SYSTEM 800

COLORSPACE ENCODING MULTIMEDIA DATA ON A PHYSICAL PAGE

BACKGROUND

Since time immemorial, certain materials (e.g., paint, ink, and/or the like) have been used to memorialize scenes and/or objects into semi-permanent to permanent mediums. Computer technologies allow for digitization and detections of these images embedded on these mediums and have introduced image processing as a technical field. Detection of images and revealing information associated therewith constitutes at least one aspect of image processing and have applications in a number of cases.

It is with respect to these and other considerations that the present improvements have been needed.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

One aspect of the present disclosure includes an apparatus for encoding multimedia data on a physical page pursuant to one or more colorspace schemes. The apparatus includes: The apparatus includes: a memory to store instructions, processing circuitry, coupled with the memory, operable to execute the instructions, that when executed, cause the processing circuitry to: receive a multimedia dataset, compress the received multimedia dataset into a compressed data-packet, encode the compressed data-packet according to a colorspace, wherein the encoding is suitable for printing on a physical medium, wherein the colorspace is associated with a plurality of colors, and wherein the compressed data-packet is represented by each of the plurality of colors, and instruct a printing device to print the encoded data on the physical medium, wherein each of the plurality of colors representing the compressed data-packet is printed on the physical medium.

Another aspect of the present disclosure includes an apparatus for encoding multimedia data on a physical page pursuant to one or more colorspace schemes. The apparatus includes: a memory to store instructions and processing circuitry, coupled with the memory, operable to execute the instructions, that when executed, cause the processing circuitry to: receive a multimedia dataset, where in various embodiments the multimedia set may include least one of i) one or more text data, ii) one or more picture data, and iii) one or more video data, compress the received multimedia dataset into a compressed data-packet, encode the compressed data-packet on one or more pages (e.g. a digital representation of material that can be subsequently printed by a printing device) according to a colorspace, where the colorspace is associated with a plurality of colors, and where the compressed data-packet is represented by each of the plurality of colors, and instruct a printing device to print the one or more pages on one or more physical pages, where each of the plurality of colors representing the compressed data-packet is printed on the one or more physical pages.

Another aspect of the present disclosure includes a method for scanning a page containing encoded multimedia data pursuant to one or more colorspaces and/or decoding the multimedia data from the page. The method includes: scanning one or more physical pages containing compressed data, where the compressed data is encoded on the one or more physical pages pursuant to a colorspace, where the colorspace is associated with a plurality of color-channels, where each one of the plurality of color-channels is associated with at least one color, and where the compressed data may represents a multimedia dataset, where in various embodiments the multimedia dataset may include r at least one of i) one or more text data, ii) one or more picture data, and iii) one or more video data, and decoding the compressed data, where the decoding is pursuant to the colorspace.

Yet another aspect of the present disclosure includes an article of manufacture that contains one or more pieces of paper with encoded multimedia information thereon. The article of manufacture includes: a sheet of paper, a plurality of colors printed on the sheet of paper and based on a colorspace with six or more colorspace, each of the six or more color-channels containing at least one distinct color in relation to one another, and where each one of the at least one distinct colors is represented in the plurality of color, and at least one of an ultraviolet channel and an infrared channel represented and detectable by a pattern of ink on the sheet of paper, where the pattern of ink can absorb or reflect at least one ultraviolet light and infrared light, where each one of the plurality of colors represents at least one bit of data of a compressed data-packet, where the compressed data-packet represents a multimedia dataset, where in various embodiments the multimedia dataset may include at least one of i) one or more text data, ii) one or more picture data, and iii) one or more video data, where the at least one of the ultraviolet channel and the infrared channel represents an error correcting code in relation to the compressed data-packet, and where the sheet of paper contains at least one additional data representing the error correcting code.

Yet another aspect of the present disclosure includes an article of manufacture that contains one or more pieces of paper with encoded multimedia information thereon. The article of manufacture includes: a sheet of paper, a plurality of colors printed on the sheet of paper and based on a colorspace with six or more color-channels, each of the six or more color-channels containing at least one distinct color in relation to one another, and where each one of the at least one distinct colors is represented in the plurality of color, and at least one of an ultraviolet channel and an infrared channel represented and detectable by a pattern of ink on the sheet of paper, where the pattern of ink can absorb or reflect at least one ultraviolet light and infrared light, where each one of the plurality of colors represents at least one bit of data of a compressed data-packet, where the compressed data-packet represents a multimedia dataset, where in various embodiments the multimedia dataset may include at least one of i) one or more text data, ii) one or more picture data, and iii) one or more video data, where the at least one of the ultraviolet channel and the infrared channel represents an error correcting code in relation to the compressed data-packet, and where the sheet of paper may contain at least fifty mega-bytes of data in addition to data representing the error correcting code.

BRIEF DESCRIPTION OF THE DRAWINGS

FIG. 5 illustrates an embodiment of a first logic flow for the system of FIG. 1 in accordance with at least one embodiment of the present disclosure.

FIG. 6 illustrates an embodiment of a second logic flow for the system of FIG. 1 and in accordance with at least one embodiment of the present disclosure.

DETAILED DESCRIPTION

Figure 1:
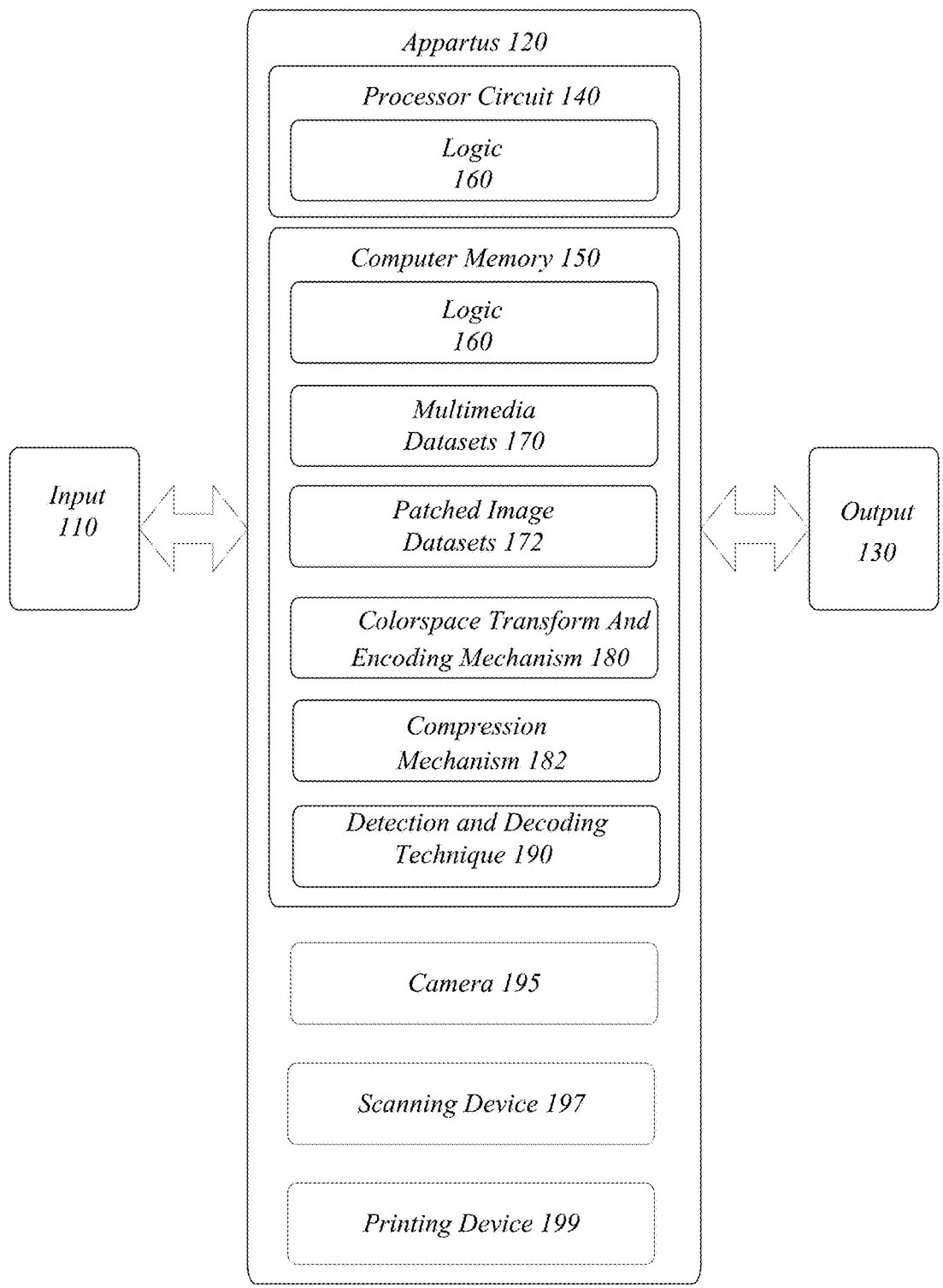
FIG. 1 illustrates an embodiment of a system to encode multimedia information or data onto one or more physical mediums, and to decode the multimedia information or data therefrom, in accordance with at least one embodiment of the present disclosure.

Various embodiments are directed to securely storing multimedia information, e.g. text, audio, video, and/or image data on one or more pages using one or more encoding, compression, and colorspace conversion techniques. The various techniques and embodiments provide numerous advantages, including providing a fail-safe for storing information on a physical material, e.g. paper, outside of the electromagnetic spectrum, which can preserve the data securely in instances where the electronic counterpart to the encoded data is inaccessible or destroyed, e.g. an electrical failure or disaster that eliminates the electronically stored counterpart to the data and/or a unique threat to electromagnetic data is imposed, such as an electro-magnetic pulse attack, thus making the storage of the data in non-electromagnetic medium particularly preferable. Although the information is stored on a physical medium outside of the electromagnetic spectrum, it can be scanned and accessed by a scanner at a subsequent time and processed by one or more computer devices and/or components for future consumption.

In various embodiments, the multimedia information can be stored on one or more pages, e.g. physical material such as paper pages, with or without applying a compression technique prior to encoding the multimedia information on physical material, such as a piece of paper or other suitable material. The encoding can be pursuant to a single colorspace technique, e.g. the information is encoded directly on the one or more pages based (e.g. a digital representation of the encoded information as digital pages is prepared and then printed by a printing device) on various color-channels associated with a single colorspace, where each color-channel represents a single bit of data (as represented by a defined area on the physical material). In various other embodiments, multiple colorspace conversions can be employed to further enhance the security of the data and/or to assist with edge detection when the data is ultimately decoded and extracted from the physical material, e.g. paper.

In various embodiments, eight or more color-channels can be associated with the colorspace to encode a total of eight or more bits of data based on a defined number of pixels printed on the page pursuant to the color-channels. In various embodiments, ultraviolet and/or infrared ink can be used on the printed page, where the layer of ultraviolet printed ink can represent one or more bits of data and/or the infrared printed ink can represent one or more bits of data. In various embodiments, eight or more color-channels can be used with an ultraviolet layer and an infrared layer for a total of ten bits of total storage per a specified area on the physical material and/or a reduced number of color-channels can be used, e.g. six, with the ultraviolet layer and/or infrared layer each representing a single bit of data, for a total of eight bits of data.

In various embodiments, tangential information, such as page orientation information, metadata, page numbers, and/or party bits (Hamming code) can also be encoded in association with the one or more color-channels and/or with respect to the ultraviolet layer and/or infrared layer. In various embodiments, in order to maximize the utility of the information encoded by the color-channels and/or ultraviolet layer and/or infrared layer, a luminance channel associated with the colorspace encoding scheme can also be used to encode the tangential data, e.g. metadata, page orientation information, and/or parity-check (Hamming Code), where a larger defined area of the page may be defined by the luminance channel, from the encoding and decoding perspective, in order to minimize errors associated with encoding and eventually scanning and decoding information associated with brightness and/or luminance features.

Various embodiments are also directed to improving image processing by identifying which colorspace model is most appropriate to use for the encoding based on detection in a particular environment, e.g. to convert between colorspace(s) to improve detection within particular environments or in association with particular targets.

Colorspace models are configured to represent color data, but most models differ in their representation of that color data. For instance, the CIELAB or LAB colorspace model represents color as three values: L for the Luminance/Lightness and Alpha (A) and Beta (B) for the green-red and blue-yellow color components, respectively. The LAB colorspace model is typically used when converting from a Red-Green-Blue (RGB) colorspace model into Cyan-Magenta-Yellow-Black (CMYK).

Depending on the application, one colorspace may be preferable for representing, printing and encoding, scanning and decoding, or storing information in relation to another colorspace, and in various embodiments, converting between colorspaces can be advantageous. In various embodiments, whether information is converted to an initial colorspace (e.g. represented by colors associated with color-channels representing bits of data), or whether information is initially converted to an initial colorspace and then subsequent colorspaces, each colorspace conversion will be associated with a mathematical description of the color-channels defining that colorspace, e.g. one or more equations or values (such as a tristimulus system in RGB or XYZ), where those mathematical relationships can serve both as a means of encoding and decoding data. Accordingly, various embodiments will use one or more variations of a theme of using at least one colorspace to encode and decode data, including data of any kind, where in one or more embodiments it can be multimedia data, e.g. video, audio, image, spatial data (which can create three-dimensional renderings), etc.

With general reference to notations and nomenclature used herein, the detailed descriptions which follow may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines may appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modifications, equivalents, and alternatives consistent with the claimed subject matter.

FIG. 1 illustrates a block diagram for a system 100. Although the system 100 shown in FIG. 1 has a limited number of elements in a certain topology, it may be appreciated that the system 100 may include more or fewer elements in alternate topologies as desired for a given implementation. The system 100 may implement some or all of the structure and/or operations for the system 100 in a single computing entity, such as entirely within a single device.

The system 100 may comprise an apparatus 120. The apparatus 120 may be generally arranged to process input 110 using various components and generate output 130 of which (some) output 130 is displayed on a display device or printed on a suitable material surface. The apparatus 120 may comprise a processor or processing circuit 140 (referred to herein interchangeably as a "processing circuit" or "processor") and computer memory 150. The processing circuit 140 may be any type of logic circuit and the computer memory 150 may be a configuration of one or more memory units.

The apparatus 120 further includes logic 160 stored in the computer memory 150 and executed on the processing circuit 140. The logic 160 is operative to cause the processing circuit 140 to represent, e.g. encode, the datasets 170 (which can be any kind of data), where, in one or more embodiments, datasets 170 are multimedia datasets 170, e.g. video, audio, image, spatial data (which can create three-dimensional renderings), etc. as a patched image data 172, e.g. where the patched image data 172 is being configured in accordance with a colorspace model, and where the patched image data may define an area, e.g. a predefined number of pixels on a physical material, for encoding the multimedia data on the physical material. In various embodiments, the encoding of the encoded datasets 170 results in one or more encoded data-packets that can then form the basis for printing a color-scheme representing the datasets 170 on one or more physical medium. The colorspace model as described herein refers to any suitable colorspace model, such as Red-Green-Blue (RGB), Cyan-Magenta-Yellow-Black (CMYK), Luminance-Alpha-Beta (LAB), XYZ, and/or the like, where each channel in the model can represent a bit of data. For example, the Alpha and Beta channels of the LAB colorspace model refer to green-red and blue-yellow color components, respectively. The green-red component may represent a variance between red and green with green in the negative direction and red in the positive direction along an axis and the blue-yellow component may represent a variance between blue and yellow with blue in the negative direction and yellow in the positive direction along an axis. In various embodiments, a predefined range of values associated with each color-channel may represent a first bit value, e.g. "1," and a second range of values may represent a second bit value, e.g. a "0," from an encoding scheme perspective. As such, as the number of color-channels is increased, the overall encoding capacity may increase as well.

In various embodiments, the logic 160 is further operative to cause the processing circuit 140 to apply an encoding and colorspace transform mechanism 180 to the multimedia dataset 170, which, as stated, can include one or more sound data, video data, audio data, image data, spatial data (which can create three-dimensional renderings), etc., in order to create an encoding scheme of patched image data 172 representing the multimedia dataset 170, where the scheme may be printable on a physical material, such as a piece of paper. The patched image data may include a plurality of patches of which each patch comprises color data (e.g., pixel data where each pixel is represented as a tuple of Red-Green-Blue (RGB) color intensities, a tuple of XYZ color intensities, a tuple pursuant to a LAB scheme, or any other suitable color scheme). In various embodiments, and as alluded to above and below, a defined area of pixels will represent one or more bits of data, e.g. if a color associated with a color-channel exceeds a certain value in relation to the range of values of a color-channel, it then can be a "1"

and if it is below a certain threshold value in relation to the range of values of that color-channel then the value can be a "0."

In various embodiments, a color-channel is a distribution of colors with a first color and second color of first and second highest prevalence, respectively, where the first color becomes a minimum in the color-channel and the second color becomes the maximum such that the boundary may be a transition between these colors. This boundary may be at least one pixel where the color changed from the first to the second color or vice versa. If the first color is set to zero (0) and the second color is set to two hundred and fifty-five (255), then, mathematically, this boundary may be located at pixel(s) that jumped between the minimum and maximum value; for example, there may be sharp division (i.e., thin boundary) in which at least two neighboring pixels transition immediately between 0 and 255. In various embodiments, as alluded to above, a range of values within a color-channel may constitute a bit value of "1," e.g. 128-255, and a range of values within a color-channel may constitute a bit value of "0", e.g. 0-127. In various embodiments, color-channels, e.g., "R," "G," and "B" define a colorspace such as RGB (e.g., a first colorspace based on a tristimulus system), and in various embodiments custom color-channels can be created using a (second) tristimulus system associated with and defining an XYZ (second, e.g. converted-to, colorspace).

In various embodiments, the encoding can be based on multiple colorspace conversions, where a second conversion may be done to enhance edge-detection of the printed scheme on the paper (e.g. converting from one colorspace to another in order to enhance detection based on a color scheme of the environment that will be associated with the scan) and/or as an additional layer of security with respect to the encoding. In various embodiments, the color-channels may be greater than three, e.g. colors that are imperceptible to the human eye can be used provided a suitable printer, e.g. printing device 199, and a suitable scanner, e.g. 197, are utilized to print and scan, respectively, the patched image data 172 corresponding to encoded scheme for the multimedia datasets 170 (e.g. video data, audio data, image data, spatial data (which can create three-dimensional renderings), etc.). Moreover, in various embodiments, in order to improve edge detection, as discussed herein, one or more color-channel ranges are selected such that a maximum color value of one or more color-channel corresponds to a unique color value, most prevalent color value, and/or highest color value of an environment associated with a scan and decoding of printed material corresponding to encoded multimedia data, such as the patched image data 172 printed on a physical medium, e.g. physical tape, paper, and/or any other material suitable for printing ink or suitable substance thereon, and the minimum color value of the color-channel corresponds to a most unique color, most prevalent color value and/or highest color value of the printed material, where additionally, the most prevalent value and/or highest color value of the printed material is also a least prevalent (lowest color value) and/or absent from the target object, entity, and/or environment associated with the scan, or visa-versa (e.g. with respect to the maximum or minimum values).

In various embodiments, as described herein, one colorspace model (e.g. XYZ) may correspond to a higher likelihood of success in edge detection than another colorspace model given a particular environment and/or physical material used for the encoding scheme. Some images provide optimal or near-optimal edge detection results when arranged in RGB while other images provide optimal or near-optimal edge detection results when arranged in LAB or an XYZ colorspace and vice versa. Accordingly, in various embodiments, the colorspace and associated colors selected for the encoding scheme of the multimedia dataset 170 can be selected with optimization of detection and scanning in mind.

In various embodiments, the logic 160 is further operative to cause the processing circuit 140 to apply the colorspace transform and encoding mechanism 180 to the multimedia data 170 to generate the patched image data 172, and then instruct a suitable printing device, e.g. printing device 199, to print the patched image data 172 on a physical medium, such as a physical page, piece of paper, tape, or any other suitable medium. In various embodiments, the logic is further operative to cause the processing circuit to instruct a scanning device, such as scanning device 197, to scan and decode the patched image data 172 to obtain the multimedia data 170. The encoding and decoding can be based on the key or mathematical relationship defining the relevant colors and color-channels of the colorspace and associated with one or more colorspace conversions. For example, if the colorspace scheme associated with the image is an XYZ colorspace, then one or more color-channels of the XYZ colorspace are defined by a tristimulus scheme, that includes at least one chromacity value, e.g. "x", and at least one luminance value, e.g. "y":

$$x=X/(X+Y+Z),$$

$$y=Y/(X+Y+Z),$$

$$z=Z/(X+Y+Z). \qquad \text{Equation 1}$$

This means that one or more color-channels are defined by the above equation and can be used to create one or more color-channels in the XYZ colorspace, including colors and color-channels imperceptible to the human eye.

In various embodiments, the encoding may be such that x, y, and z may have certain values that define the particular color-channels associated with the space, and pre-defined color range values within the channel may determine whether the channel represents a "1" or a "0" value. Without knowing the initial x, y, and z values of the various color-channels, decoding the encoded data may not be possible, and this feature can be amplified, in various embodiments, by having the printing device 199 print colors that are not associated with the color-channels defined by one or more iterations of Equation 1 or any other suitable colorspace defining scheme. Accordingly, the equations governing the particular colorspace, of which the above is one example and for one colorspace conversion or conversions, provide the basis for encoding the image data 172 onto a physical medium, and also the basis for decoding the multimedia data 170 from the image data 172, as the suitable scanner, e.g. scanning device 197, can be configured to decode the information by having access to the mathematical relationship or key, e.g. Equation 1, defining the colorspace.

In various embodiments, prior to performing any encoding operation, a compression mechanism can apply any suitable compression technique to the multimedia data 170 to reduce its size and increase the amount of data that can be represented and/or encoded as a result of the conversion associated with patched image data 172. Any suitable compression technique can be applied to the multimedia data 170 prior to the conversion, e.g. any suitable compression per an MPEG® scheme (such as H.264), VPEG® scheme, or any other suitable scheme can be used. In various embodiments, application of a compression technique to the compressed data results in one or more compressed data-packets and application of an encoding scheme to the compressed data-packets (as discussed herein) results in an encoded version of the compressed data-packets, e.g. encoded data-packets of the compressed data-packets.

In various embodiments, and as discussed in more detail with respect to one or more embodiments provided below, if the initial or subsequent (in instances where multiple colorspaces and conversions thereto or therefrom are used) colorspace has a luminance factor, such as an XYZ colorspace, the luminance factor can be temporarily filtered out when determining the various chromacity values desired for use with the image data 172.

In various embodiments, the luminance factor, e.g. "y" of Equation 1, can be reintroduced (or used from the outset if it was never filtered out), to define tangential information related to the multimedia data 170, such as metadata, an error correcting code, e.g. Hamming code, and/or page orientation information. Accordingly, in various embodiments, logic 160 may be further operative to cause the processing circuit 140 to cause the image dataset 172 to associate particular data distinct from the dataset 172 in relation to the luminance value of a colorspace and for a defined area; and as such, instruct the printing device to define an area with a factor of magnitude larger than the encoded data area defined by pixels associated with the image data for the purpose of having encoding luminance channel information. In various embodiments, the area defining the luminance value is a factor of magnitude larger than an area with just pixels carrying the encoded color scheme because of the higher error rate associated with scanning information associated with brightness values. Irrespective of the size of the area defined by the encoded luminance value, a range of brightness values correspond to a "1" bit value (brightness higher than or equal to a certain value) and a range of values correspond to a "0" bit value (brightness less than a certain value).

In various embodiments, the patched image data 172 can provide for a scheme that includes at least one infrared layer and at least one ultraviolet layer, in addition to colors associated with one or more color-channels. In various embodiments, the logic may be further operated to cause the processing circuity 140 to instruct a printing device, e.g. printing device 199, to print the patched image data 172 on a physical medium, such as a physical page, a piece of paper, physical tape, or any other suitable medium with one or more inks reflecting one of or both of the ultraviolet light and infrared light on top, and inks associated with one or more color-channels below. In various embodiments, the ultraviolet layer is on top of both the infrared layers and the color-channel layers. In various embodiments, the presence or absence of ultraviolet layer constitutes a bit of data, e.g. a value of "1" if ultraviolet light is reflected and a value of "0" if it is absorbed or otherwise not reflected, and the presence or absence of an infrared layers constitutes a bit of data, e.g. a value of "1" if ultraviolet light is reflected and a value of "0" if it is absorbed or otherwise not reflected. In various embodiments, as discussed below, a detection and decoding technique 190 can be configured to consider the presence or absence of ultraviolet and/or infrared light as indicative of a bit of data.

In various embodiments, once encoding (and if applicable, compression) takes place, the logic 160 may be further operative to cause the processing circuit 140 to scan the physical medium containing the patched image data, e.g. using a suitable scanning device 197, apply an detection and decoding technique 190 to the patched image data 172 (as represented on a suitable physical medium, such as paper) and to decode the multimedia data 170 as represented by the patched image data 172. The edge detection technique of the detection and decoding technique 190 is an image processing technique that refers to any one of a number of algorithms for identifying edges or boundaries of objects within images. In general, the edge detection technique of the detection and decoding technique190 provides information (e.g., pixel data) indicating positions of edges in the image data of the image datasets 170; and in various embodiments, the decoding scheme of the detection and decoding scheme 190 determines what color-channels contain relevant information based on the mathematical relationships defining the colorspace or colorspaces associated with the patched image data 172, and may also determine the bit value of those color-channels based on the color values associated therewith, e.g. the value of a particular color in the range of values associated with a particular color-channel.

Accordingly, in various embodiments, the multimedia dataset 170 as encoded into an encoded data-packet on one or more physical mediums, including pieces of paper, and pursuant to one or more colorspace conversions and/or utilizing one or more ultraviolet and infrared layers, and as may be associated with patched image data 172, may be decoded by one or more components of system 100 pursuant to a key defining the one or more colorspaces associated with encoding. In various embodiments, when compression is done prior to encoding, the encoded data-packet may be decompressed prior to the decoding using any suitable decompression technique that serves as a counterpart to the encoding.

Some implementations of the edge detection technique of the detection and decoding technique 190 operate by detecting discontinuities in brightness and, for those implementations, having the image data, e.g. patched image data 172, in a LAB colorspace, or XYZ colorspace over RGB provides more precise edge detection results. Some implementations of the edge detection technique of the detection and decoding technique 190 provide accurate edge detection results when the image data is modeled according to HCL (Hue-Chroma-Luminance) instead of RGB and/or, as stated above and below, when converting from RGB to another colorspace, such as XYZ.

In various embodiments, the logic 160 is further operative to cause the processing circuit 140 to identify which colorspace model to use in transforming a given image prior to edge detection to achieve near-optimal edge detection results, e.g. optimizing the patched image data 172 for detection. The logic 160 is further configured to cause the processing circuit 140 to apply the colorspace and encoding transform mechanism 182 to transform the image data 172 from one colorspace containing the encoded version of the multimedia data 170, e.g. part of image dataset 172, into transformed image data in accordance with another colorspace model (e.g. XYZ), e.g. another part of image dataset 172, where the other or second colorspace model has a higher likelihood than the first colorspace model at edge detection for the final encoded image group. It is appreciated that the other colorspace model may be any colorspace model including those with a different number of channels than the colorspace model.

In various embodiments, the logic 160 can be further operative to cause the processing circuit 140 to apply the colorspace and encoding transform mechanism 182 to determine a colorspace that is optimal for detection in association with a particular environment where a scan of the printed version of the patched image dataset 172 takes place. In various embodiments, a colorspace or histogram representation of the environment can be part of the image datasets 170. The logic 160 can be further operative to cause the processing circuit 140 to determine the optimal colorspace based on one or more colorspace conversion operations (where on example is provided in greater detail with reference to FIG. 2B). In various embodiments, a printed scheme according to one or more colorspaces may be provided for the patched image dataset 172 without first considering the colors of the environment where the scan may take place, in which case, the colorspace representation and associated colors of the environment where the scan takes place can be adjusted in relation to the printed patched image data 172 to optimize edge detection.

The one or more colorspace models as described herein, as stated and implied elsewhere herein, refers to any suitable colorspace model, such as colorspace employing a tristimulus system or scheme, the Red-Green-Blue (RGB), the Luminance-Alpha-Beta (LAB), an XYZ colorspace, and/or the like and/or variations of the same. Similarly, although various embodiments may refer to a particular conversion from one specific colorspace to another specific colorspace, conversions between other colorspaces are contemplated and consistent with the teachings of the present disclosure.

In various embodiments, as described herein, one colorspace model (e.g., RGB or XYZ) may correspond to a higher likelihood of success in edge detection than another colorspace model in terms of detection of a displayed or printed image, e.g. an encoded representation of multimedia data 170 in the form of patched image data 172, in relation to an environment with a particular color distribution. Moreover, particular colors and color-channels associated with a colorspace may offer superior edge detection in relation to the object, entity, or environment. Some images provide optimal or near-optimal edge detection results when arranged in RGB while other images provide optimal or near-optimal edge detection results when arranged in XYZ or LAB and vice versa. By way of example, an image depicting a red balloon on a green field may appear much different in RGB than in LAB; therefore, with respect to edge detection, LAB may provide a higher likelihood than RGB at successfully identifying and locating edges (e.g., boundaries) of the red balloon, or a printed encoded multimedia scheme, e.g. as represented by patched image data 172, that had a red color in the green environment.

In various embodiments, the system 100 can include one or more of a camera or video device 195, where both device 195 and device 197 can be any suitable device for obtaining, capturing, editing, and/or scanning images, including but not limited to video or camera pictures, of objects, entities, and/or environments. The logic 160 can be configured to capture or scan images of a particular object, entity or environment using device 195 and/or device 197, where the captured images can become part of image datasets 172 and used for determining suitable colorspaces, performing colorspace conversions, and/or scanning images determined from colorspace conversions, as may be consistent with the teachings provided herein, including selecting an optimal colorspace for an encoded multimedia scheme and/or an environment associated with the scanning thereof.

Figure 2A:
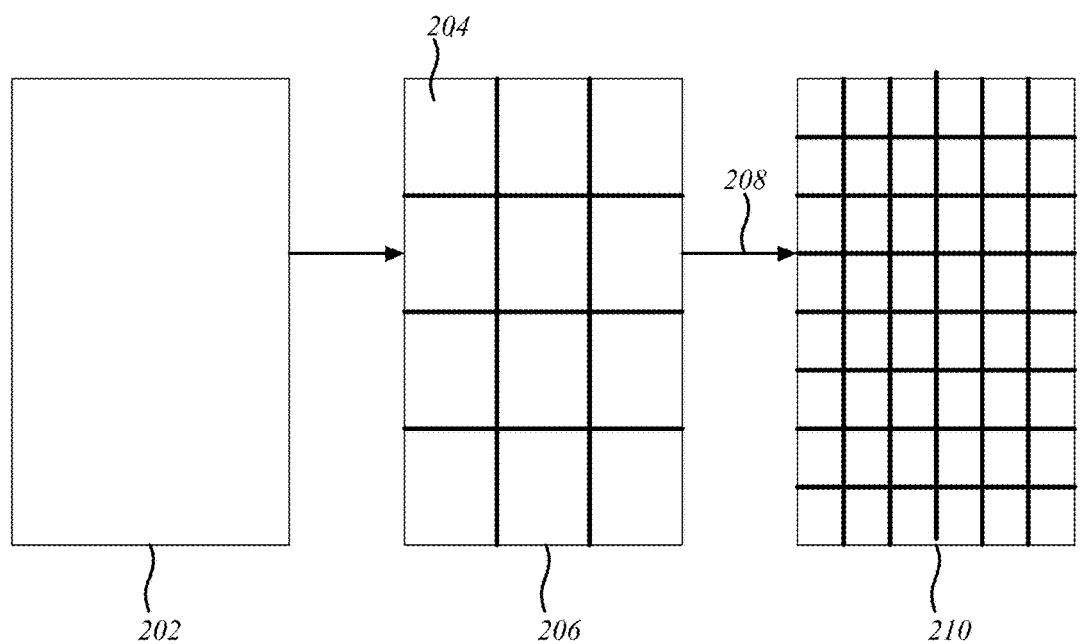
FIG. 2A illustrates an embodiment of a clustering process for the system of FIG. 1 and in accordance with at least one embodiment of the present disclosure.

FIG. 2A illustrates an embodiment of a clustering process 200A for the system 100. The clustering process 200A operates on image datasets (e.g., the multimedia datasets 170 and/or image datasets 172 of FIG. 1) storing color data for images.

In some embodiments of the clustering process 200A, color data 202 of an image undergoes a patching operation where the image is processed into a plurality of patches 204 of patched image data 206. Each patch 204 of the patched image data 206 includes color data in accordance with a colorspace model, such as pixel data having RGB tuples, where the pixel may represent an encoded representation of multimedia data. The clustering process 200A further processes the patched image data 206, via a transformation operation 208, by applying a colorspace transform mechanism on the color data of the patched image data 206 to transform patched image data into transformed image data of a transformed image 210, where the transformed image may also represent an encoded representation of multimedia data. The color data of the patched image data 206 is configured in accordance with the colorspace model and new color data for the transformed image 210 is generated according to another colorspace model.

In some embodiments, the clustering process 200A performs a mini-colorspace transform for at least one patch of the patched image data 206, possibly leaving one or more patches without a transformation. Via the transformation operation 208, the mini-colorspace transform modifies the color data in the at least one patch to transform patched image data into transformed image data of a transformed image 210. The clustering process 200A may perform stitching between patches to make the patched image data 206 uniform as opposed to creating artificial edges.

Figure 2B:
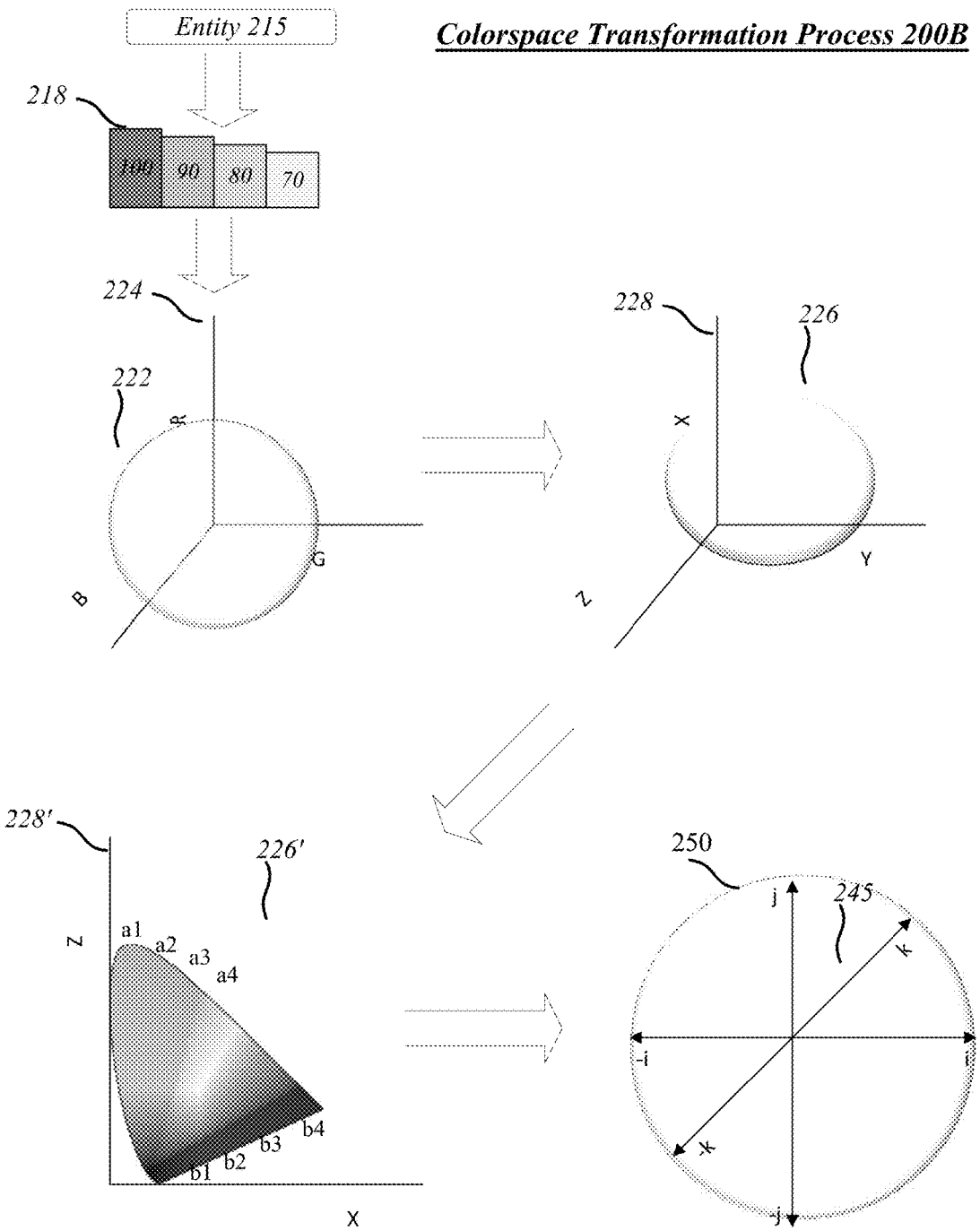
FIG. 2B illustrates an embodiment of a colorspace conversion technique useful for encoding and/or decoding data, including by the system of FIG. 1, and in accordance with at least one embodiment of the present disclosure.

FIG. 2B illustrates an example of a colorspace conversion scheme 200B in accordance with various embodiments of the present disclosure. A histogram 218 representation of a particular environment 215 is provided (where the numbers 100, 90, 80, and 70 are intended to represent a simplified version of colors distribution values of one or more colors representing the particular object, entity, or environment 215), where the environment 215 may be associated with a scan of printable material representing encoded data of any kind, where in various embodiments the data is multimedia data (e.g. video data, audio data, image data, spatial data (which can create three-dimensional renderings), etc.). The histogram 218 can be generated by having one or more components of system 100 performing a scan of the environment 215 and generating a histogram 218 of the most prevalent colors, least prevalent colors, or absent colors of the environment 215. In one or more embodiments, the histogram 218 can be of four, six, eight or more colors of the most prevalent colors of the object, entity, or environment. Since various embodiments of the present disclosure expressly contemplate using colors imperceptible to the human eye, there is no limitation on the number of colors that can be used with respect to the histogram 218, the colorspace conversions discussed herein, or any images generated from the colorspace conversions, including but not limited to image data providing an encoded representation of multimedia data (e.g. video data, audio data, image data, spatial data (which can create three-dimensional renderings), etc.), and can have in excess of four colors, six color, or eight colors, and four color-channels, six color-channels, or eight color-channels, where the colors and/or color-channels are distinct and different with respect to one another.

In various embodiments, one or more components of system 100 can determine the most prevalent colors associated with environment 215, and the resulting histogram 218 may be based on that determination. The histogram 218 can be used to map the most prevalent colors to a distribution 222 associated with a suitable colorspace 224, including but not limited to an RGB colorspace 224. In various embodiments, the colors of histogram 218 are mapped pursuant to the tristimulus values of the RGB colorspace, e.g., "R," "G," and "B." Any suitable mathematical conversion, e.g., linear-algebraic, etc. can be used to map the conversion to the RGB colorspace, e.g., convert the mapped RGB colorspace to another colorspace.

In various embodiments, the color-channels of distribution 222 may represent one or more bits of data for an encoded representation of data, e.g. multimedia data, where the multimedia data may be compressed or un-compressed.

In various embodiments, once the distribution 222 is mapped according to the RGB colorspace 224, one or more components of system 100 can convert the RGB distribution 222 to a new colorspace 226 with a distribution 228 pursuant to the new colorspace 226. Any suitable colorspace conversion can be used, including converting to an XYZ colorspace, where the conversion can be pursuant to any suitable mathematical conversions and equations that govern the XYZ colorspace, including suitable tristimulus conversions between RGB and XYZ. In various embodiments, "Y" represents a luminance value of the XYZ space and at least one of "X" and "Z" (or both) represent a chrominance value of the colorspace and an associated distribution, e.g. 226 plotted pursuant to the XYZ colorspace.

In various embodiments, the color-channels of new colorspace 226 may represent one or more bits of data for an encoded representation of data, e.g. multimedia data, where the multimedia data may be compressed or uncompressed. In various embodiments, the encoding is limited to the second conversion, e.g. only the color-channels of new colorspace 226 provide for an encoded representation of multimedia data. In various embodiments, both the color-channels of colorspace 224 and colorspace 226 provide for an encoded representation of multimedia data, whether compressed or uncompressed, thus providing for multi-level encryption.

In various embodiments, the luminance channel "Y" is filtered out resulting in colorspace 228' and distribution 226', which can assist in making determinations solely on actual chromatic values associated with the entity, object, or environment 215, without considering luminance (this is helpful at least because colors can be used that are imperceptible to the human eye). In various embodiments, four (or more) lines can be defined by points (a1, b1), (a2, b2), (a3, b3), and (a4, b4), and are selected to have a maximum distance apart with respect to distribution 226'. In various embodiments, the points a1, a2, a3, and a4 are selected to correspond to the most prevalent colors associated with entity, object, or environment 215 and b1, b2, b3, and b4 by extension, being opposite to those colors, may represent the least prevalent or absent colors in association with entity, object, or environment b1, b2, b3, b4. These lines may define vectors for a new colorspace conversion in an XYZ or other suitable colorspace 245 and may form the basis for new XYZ tristimulus values.

An image or image set, such as the patched image data 172 representing encoded data, e.g. multimedia data (e.g. video data, audio data, image data, spatial data (which can create three-dimensional renderings), etc.), as discussed above, can be made using colors associated with the new colorspace 250 and a distribution 245 of colors defined by color-channel vectors (i,–i), (j, –j), (k, –k), an additional color-channel and all other color-channels (omitted from display due to the limitations of three-dimensional space) associated therewith. In various embodiments, since the colors may correspond to less prevalent or absent colors in relation to where a potential scan may occur (or what is being scanned), e.g., printed material corresponding to encoded multimedia data in an environment with colors that have a maximum difference in relation thereto, edge detection is enhanced.

Alternatively, although not expressly shown, the maximum distance from the most prevalent colors to least prevalent colors can be determined, e.g., a1 to b1, a2 to b2, etc., and then lines can be drawn from b1, b2, b3, and b4 in a direction tangential, parallel or opposite a vector or direction associated with a1, a2, a3, and a4. The color-channel vectors (i,–i), (j, –j), (k, –k), an additional color-channel and all other color-channels (omitted from display due to the limitations of three-dimensional space) associated with colorspace 250 may be entirely colors absent and/or mildly prevalent in relation to entity, object, or environment 215, which can further enhance edge detection.

In various embodiments, the color-channels of new colorspace 250 may represent one or more bits of data for an encoded representation of data, such as multimedia data (e.g. video data, audio data, image data, spatial data (which can create three-dimensional renderings), etc.), where the multimedia data may be compressed or uncompressed. In various embodiments, the encoding is limited to the conversion associated with new colorspace 250, e.g. only the color-channels of new colorspace 226 provide for an encoded representation of multimedia data. In various embodiments, more than one of the color-channels of colorspace 224, colorspace 226, colorspace 228', and/or colorspace provide for an encoded representation of multimedia data, whether compressed or uncompressed, thus providing for multi-level encryption.

In various embodiments, whether luminance channel "Y" is filtered out or whether it remains unfiltered throughout one or more colorspace conversions, it may be used to provide an encoded representation of tangential information in relation to the encoded multimedia data, such as page orientation information, metadata, page numbers, and/or party bits (Hamming code). In various embodiments, where the luminance channel "Y" is filtered out in relation to colorspace 228', it can be reintroduced at any subsequent conversion when chromacity values have been determined, such as with respect to new colorspace 250, in order to provide for the luminance encoding feature in association with tangential information.

In various embodiments, when performing the colorspace conversion between 228' and 250, in addition to carrying out the algebraic or other suitable conversions associated with the XYZ colorspace, the color-channel vectors, e.g. (i,–i), (j, –j), (k, –k), may be orthogonal to one another by performing any suitable mathematical and/or orientation operation on the vectors and/or by selecting suitable points on distribution 226' and distribution 228' when making the conversion. In various embodiments, a second maximum difference between one or more points can be taken in colorspace 250, in addition to an orientation operation to center the distribution 245 along the axis of the newly defined color-channel vectors, e.g. (i,–i), (j, –j), (k, –k), such that the color-channel vectors are orthogonal and have a maximum distance in relation to one another. In various embodiments, performing at least one of the orthogonality operation, maximum determination, and/or orienting operation can further enhance edge detection of an image generated for scanning, such as an encoded multimedia scheme printed on a physical medium, in relation to an entity, object, or environment 215 to be scanned.

In various embodiments, the various color-channels described above, including each vector, e.g. (–i, i), defines a first color that is a minimum in the color-channel and the second color becomes the maximum, such that the boundary may be a transition between these colors. This boundary may be at least one pixel where the color changed from the first to the second color or vice versa. If the first color is set to zero (0) and the second color is set to two hundred and fifty-five (255), then, mathematically, this boundary may be located at pixel(s) that jumped between the minimum and maximum value; for example, there may be sharp division (i.e., thin boundary) in which at least two neighboring pixels transition immediately between 0 and 255. In various embodiments, the boundary is such it may be a transition between these colors where, as discussed above, one or more color-channel ranges are selected such that a maximum color value of one or more color-channel corresponds to a unique color value, most prevalent color value, and/or highest color value of a target object, entity, and/or environment associated with a scan and the minimum color value of the color-channel corresponds to a most unique color, most prevalent color value and/or highest color value of the printed scheme corresponding to printed encoded data, e.g. multimedia data (e.g. video data, audio data, image data, spatial data (which can create three-dimensional renderings), etc.), where additionally, the most prevalent value and/or highest color value of the printed encoded multimedia data is also a least prevalent (lowest color value) and/or absent from the target object, entity, and/or environment associated with a scan of the printed material, or visa-versa (e.g. with respect to the maximum or minimum values).

The length of the color-channel can be adjusted accordingly based on the capabilities of the scanning and image-acquiring abilities of the various components, e.g. camera or video device 195, scanning device 197, and/or recognition component 422-4 (discussed below with respect to FIG. 4), where the length increases the number of different colors between the minimum and maximum point of the color-channel.

In various embodiments, the conversions between the RGB colorspace to the XYZ colorspace and/or a first converted-to (derivative) XYZ space to another XYZ colorspace can be governed by the tristimulus equations (Equation 1) that define the converted colorspace and a distribution of colorspace, where the value of x+y=z can be normalized to 1.

In various embodiments, the value of "X," "Y," and "Z," is dependent on the input colors from the RGB colorspace (or in the case of a second conversion, from the converting colorspace). Although the tristimulus values are three be definition, as noted above, the conversion can involve more than three color-channels, including color-channels that define colors imperceptible to the human eye. In various embodiments, the conversion governed by Equation. 1 can form a key for a scanning device to scan an image defined by the conversion, such as an encoded data, e.g. multimedia data scheme (e.g. video data, audio data, image data, spatial data (which can create three-dimensional renderings), etc.) printed on a physical medium. In various embodiments, this means that in addition to providing a vehicle for increasing the numbers of color-channels and colors for an image to be scanned, which means increasing bits of information that can be encoded therein, another benefit of various embodiments is offering a manner to securely encode information, e.g. without knowing the equation or equations of what colorspace govern and without knowing the input values (which are based on the first colorspace associated with the entity, object, or environment 215), a successful scan cannot occur. Accordingly, in various embodiments, the logic 160 of system 100 can cause a processor 140 (or an application programmed to carried out the operations of 100) to provide a scanning device 197 with a key governed by Equation 1 in order to scan and decode an image, e.g. printed material corresponding to encoded multimedia data (e.g. video data, audio data, image data, spatial data (which can create three-dimensional renderings), etc.) that is encoded pursuant to one or more colorspace conversions associated with Equation 1.

In various embodiments, the logic 160 of system 100 can cause a processor 140 to provide a scheme for adding either one or both of an ultraviolet layer and/or an infrared layer to a scheme defining encoded data, e.g. multimedia data (e.g. video data, audio data, image data, spatial data (which can create three-dimensional renderings), etc.), and instruct a printing device 199 to print the same, where the printed encoded multimedia data contains more than one non-black or non-white colors governed by any suitable colorspace, and can be scanned and decoded by a suitable scanning device, e.g. scanning device 197. In various embodiments, the scheme may include both an ultraviolet layer and an infrared layer, where the ultraviolet layer may form the first layer of an image in order to take advantage of its properties. In various embodiments, the non-black and non-white colors of the printed scheme corresponding to encoded multimedia data may be determined by one or more colorspace conversion techniques as outlined herein. In various embodiments, non-black and non-white colors means colors that are not black or white. In various embodiments, non-black and non-white colors means colors that are not black, white or based on a greyscale distribution.

Figure 3:
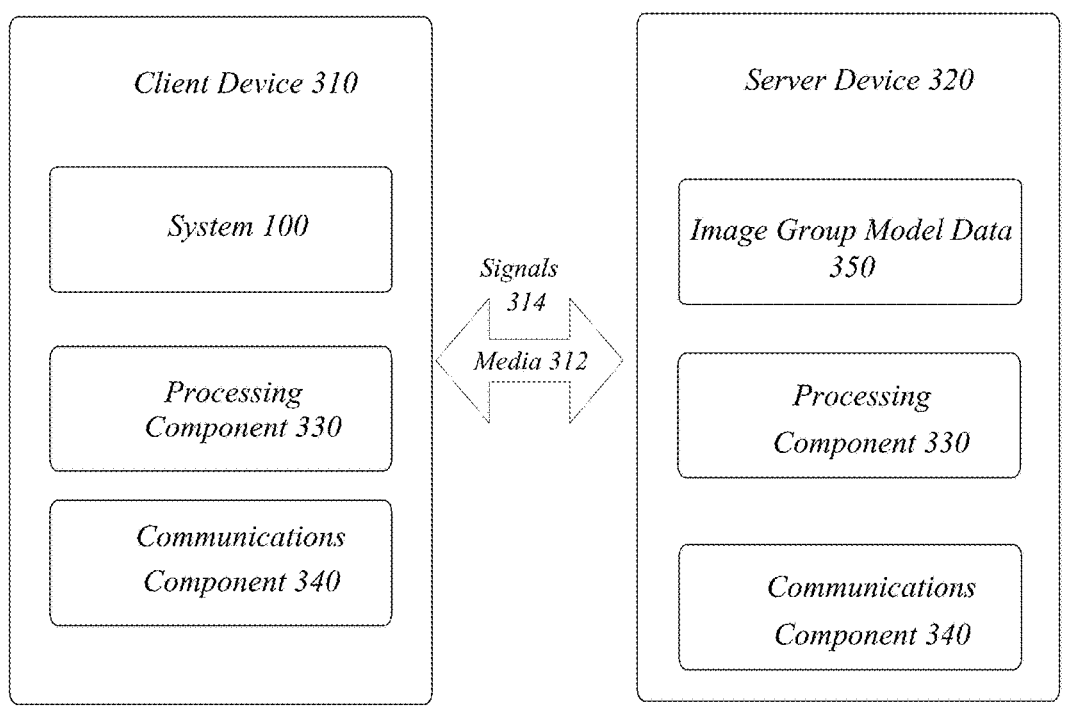
FIG. 3 illustrates an embodiment of a centralized system for the system of FIG. 1 in accordance with at least one embodiment of the present disclosure.

FIG. 3 illustrates a block diagram of a distributed system 300. The distributed system 300 may distribute portions of the structure and/or operations for the system 100 across multiple computing entities. Examples of distributed system 300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 300 may comprise a client device 310 and a server device 320. In general, the client device 310 and/or the server device 320 may be the same or similar to the apparatus 120 as described with reference to FIG. 1. For instance, the client device 310 and the server device 320 may each comprise a processing component 330 which is the same or similar to the processing circuit 140 as described with reference to FIG. 1. In another example, the devices 310, 320 may communicate over a communications media 312 using communications signals 314 via a communications component 340.

The server device 320 may communicate with other devices over the communications media 312, using communications signals 314, via the communications component 340. The other devices may be internal or external to the device 320 as desired for a given implementation.

The client device 310 may comprise or employ one or more client programs that operate to perform various methodologies in accordance with the described embodiments. In one embodiment, for example, the client device 310 may implement the system 100 including the logic 160 of FIG. 1, where in various embodiments, the client device 310 can implement one or more operations to form an image based on one or more colorspace conversions as outlined above and herein.

The server device 320 may comprise or employ one or more server programs that operate to perform various methodologies in accordance with the described embodiments. In one embodiment, for example, the server device 320 may implement the clustering process 200A of FIG. 2A and generate image group model data 350 and/or generate image group model data 350 by performing one or more of the encoding and colorspace conversion operations of scheme 200B. The image group model data 350 can include a printing scheme or color distribution for an image corresponding to encoded data, e.g. multimedia data (e.g. video data, audio data, image data, spatial data (which can create three-dimensional renderings), etc.), e.g. patched image data 172, to be printed and/or scanned in association with an environment 215.

The devices 310,320 may comprise any electronic device capable of receiving, processing, and sending information for the system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The devices 310, 320 may execute instructions, processing operations, or logic for the system 100 using the processing component 330. The processing component 330 may comprise various hardware elements, software elements, or a combination of both. Examples of hardware elements may include devices, logic devices, components, processors, microprocessors, circuits, processing circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), Application-specific Standard Products (ASSPs), System-on-a-chip systems (SOCs), Complex Programmable Logic Devices (CPLDs), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The devices 310, 320 may execute communications operations or logic for the system 100 using communications component 340. The communications component 340 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 340 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 312 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

Figure 4:
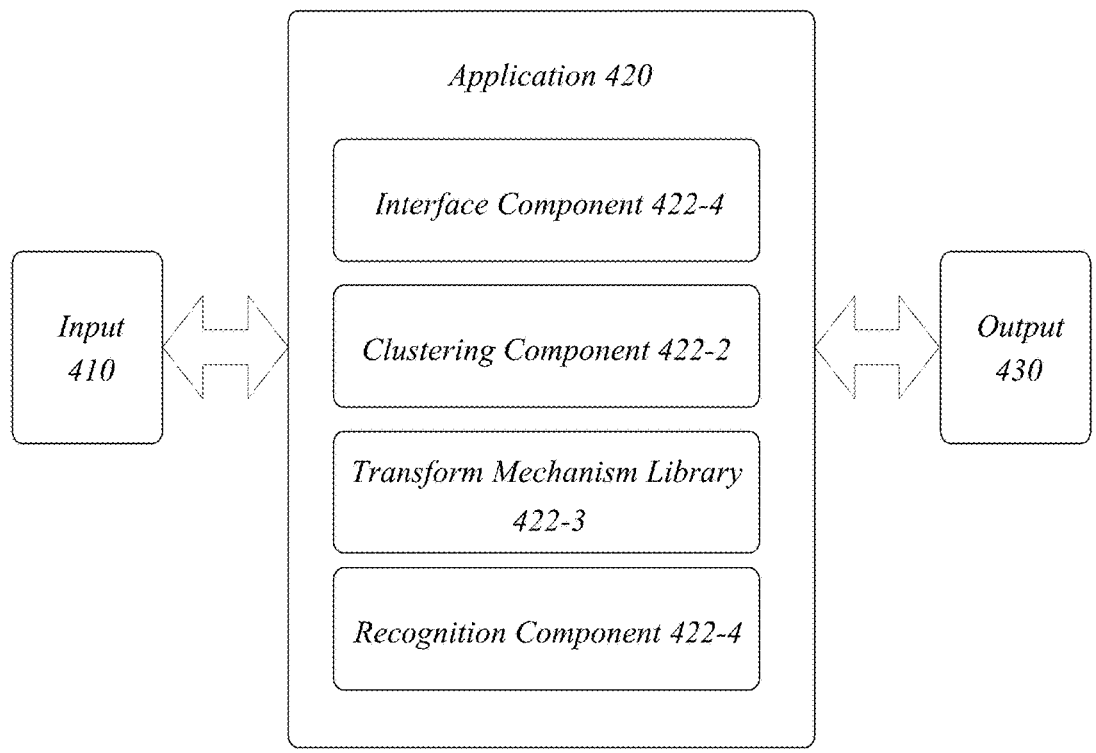
FIG. 4 illustrates an embodiment of an operating environment for the system of FIG. 1 in accordance with at least one embodiment of the present disclosure.

FIG. 4 illustrates an embodiment of an operational environment 400 for the system 100. As shown in FIG. 4, the operating environment 400 includes an application 420, such as an enterprise software application, for processing input 410 and generating output 430.

The application 420 comprises one or more components 422-$a$ where $a$ represents any integer number. In one embodiment, the application 420 may comprise an interface component 422-1, a clustering component 422-2, a transform mechanism library 422-3, and a recognition component 422-4. The interface component 422-1 may be generally arranged to manage a user interface for the application 420, for example, by generating graphical data for presentation as a Graphical User Interface (GUI). The interface component 422-1 may generate the GUI to depict various elements, such as dialog boxes, HTML forms having rich text, and/or the like.

The clustering component 422-2 may be generally arranged to organize images into image groups or clusters. Some embodiments of the clustering component 422-2 execute the clustering process 200A of FIG. 2A and/or one or more of the encoding, colorspace conversion operations, and/or decoding operations associated with scheme 200B of FIG. 2B and generates the image group model data 350 of FIG. 3. In various embodiments, the clustering component 422-2 identifies, for each image group, a particular colorspace transform having a higher likelihood than a current colorspace transform of success in edge detection for that group as outlined herein or otherwise suitable and uses that scheme to encode multimedia data on one or more physical medium, such as a piece of paper, and using any suitable printing device. In various embodiments, the clustering component 422-2 may perform the above-mentioned clustering process for a variety of edge detection techniques, resulting in sets of image groups where each set of image groups corresponds to a particular technique. Edge detection techniques vary in how boundaries are identified in an image; some techniques detect differences in color whereas other techniques measure another attribute. Some techniques differ with respect to how color differences are even measured. It is possible for one technique to alter certain steps and create multiple techniques.

The colorspace transform library 422-3 includes a plurality of colorspace transform mechanisms and may be generally arranged to provide an encoding and colorspace transform mechanism for application on an image, transforming that image into a transformed image in accordance with a different colorspace model than the image's original colorspace model, resulting in encoded data that is optimal for detection, e.g. encoded multimedia data optimal for detection on a physical medium, such as paper.

As described herein, the colorspace model refers to a technique for modeling an image's color data, such as in RGB or in LAB, or RGB to XYZ, or RGB to XYZ to another XYZ. In general, and as outlined in one or more embodiments herein, the colorspace transform mechanism performs mathematical operations to map a data point within the image's original/current colorspace model into a corresponding datapoint in accordance with the different colorspace model. This may involve converting the datapoint's value(s)—which are in one domain—into corresponding value(s) for the corresponding datapoint. As example, the colorspace transform may convert an RGB pixel having a tuple of RGB values into a LAB pixel having a tuple of LAB values, an RGB pixel having a tuple of RGB values into an XYZ pixel having a tuple of XYZ values, and/or an RGB pixel having a tuple of RGB values into an XYZ pixel having a tuple of XYZ values and again into another XYZ pixel having a tuple of other XYZ values. The pixels associated with the final conversion can define an encoded scheme pursuant to a color distribution, where the encoded scheme may be a scannable image, such as image data printed on paper (or any other suitable physical medium) and corresponding to encoded multimedia data.

The recognition component 422-4, such as a suitable scanner, printer and/or camera or application for the same, may be generally arranged to execute an edge detection technique as part of a recognition operation on the transformed image. One example of a well-known recognition operation is Optical Character Recognition (OCR), although any suitable recognition technique may be used. The application 420 invokes the recognition component 422-4 to perform various tasks including scanning an encoded scheme corresponding to multimedia data and decoding it. The recognition component 422-4 can be configured to contain a key, e.g. a mathematical equation or equations with specified inputs defining a colorspace conversion, such that it scans relevant colors reflected by a printed scheme of encoded data, e.g. encoded multimedia data, where the colors are based on one or more colorspace transformation techniques as outlined herein, where the key defines a final transformation that defines color-channels and a colorspace associated with colors of the scannable image, where color-channels defined by the key each represent at least one bit of encoded data, and where the key can be used to perform the decoding when a scan takes place.

In various embodiments, the recognition component 422-4 can print or provide a schema for printing an image, e.g. image data constituting an encoded representation of multimedia data, that contains one or more non-black and non-white colors and one or both of an ultraviolet layer and an infrared layer. The color-channels associated with each non-black and non-white color each can constitute at least one bit of data, and each one of the infrared and ultraviolet layers can each constitute one bit of data. In various embodiments, each one of the non-black and non-white colors are generated by a colorspace transformation mechanism or technique and are scannable by a key associated with the transformation mechanism. In various embodiments, the number of color-channels can be adjusted to be greater than or equal to four color-channels, as the recognition component 422-4 can be adjusted to scan any number of colors, including colors not perceptible to the human eye.

In various embodiments, the non-black and non-white color-channel can be used in conjunction with one or both of the infrared or ultraviolet layers on a scannable image, where each of one of the color-channels, ultraviolet layer(s), and/or infrared layer(s) represent a bit of data and a different manner of encoding data into the image, and as such, eight or more bits of data can be encoded into the image. In various embodiments, the ultraviolet layer may be printed or displayed first in relation to the infrared layers and the various layers associated with non-black and non-white color-channels to take advantage of the ultraviolet layer's properties.

In various embodiments, the image containing all or one of the layers associated with the non-black and non-white color-channel layers, the ultraviolet layers, and the infrared layers can be scanned by the recognition component 422-4 for a verification component, where the recognition component 422-4 may contain or receive a key that is based on an equation related to a colorspace conversion, e.g. Equation 1, where the colorspace conversion reveals the relevant color-channels with associated colors containing the information, in addition to one or more verification bits indicating whether the presence or absence of an ultraviolet and/or infrared layer is indicative of encoded information. Accordingly, the key and/or verification bit provides a manner of decoding information.

In various embodiments, application 420 is configured to contain the key and/or verification bit and provide an output 430 once the scan of the image is verified locally. In various embodiments, the recognition component 422-4 can require an additional verification step of contacting a host system that contains one or more of the functionalities of system 100, to confirm, e.g., by one or more comparison steps, that the key and/or verification bit used by the recognition component 422-4 is accurate. If the key is accurate, and the scan is confirmed by the recognition component 422-4, then the output 430 of application 420 is one or more access, transfer, or receipt of information, including currency, personal, and/or financial information, to another entity.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art may understand and appreciate that a methodology could alternatively be represented as a series of interrelated states or events, such as in a state diagram. Moreover, not all acts illustrated in a methodology may be required for a novel implementation.

FIG. 5 illustrates one embodiment of a logic flow 500. The logic flow 500 may be representative of some or all of the operations executed by one or more embodiments described herein.

In the illustrated embodiment shown in FIG. 5, the logic flow 500 receives a multimedia dataset, such as video data, audio data, image data, spatial data (which can create three-dimensional renderings) or any other suitable data 502. For example, the logic flow 500 may receive a representative dataset directly from any suitable system or computer device and/or the logic flow may use any suitable camera or scanning device to obtain the data as provided for herein or as otherwise may be suitable.

The logic flow 500 may compress the multimedia dataset using any suitable compression technique 504 prior to performing any additional operations for the purpose of conserving computing resources and by extension maximizing the efficiency of any subsequent operations. Any suitable compression technique can be used, including but not limited to a suitable compression per an MPEG® scheme (such as H.264), VPEG® scheme, or any other suitable scheme can be used.

The logic flow 500 may encode the compressed data pursuant to a colorspace model 506. Any suitable series of colorspace conversion and encoding techniques as discussed herein may be used to encode the multimedia data pursuant to a colorspace scheme, including determining an optimal colorspace suitable for scanning the encoded multimedia data in relation to the environment where the scan will take place, and ascribing one or more color-channels as indicative of a bit of data, e.g. six or eight color-channels, in association with the optimal colorspace, where the mathematical definition of the colorspace constitute the encoding key for the multimedia data. In various embodiments, the encoding scheme may include one or all of an ultraviolet layer indicative of a bit of multimedia data, an infrared layer indicative of a bit of multimedia data, and/or a luminance channel or layer indicative of tangential data, such as metadata, page orientation information, and/or a parity check (Hamming Code).

In various embodiment, one or more pixels associated with the encoded scheme may be represented by a color-channel of a final colorspace based on one or more colorspace conversions, e.g. the XYZ colorspace with color-channels representing the least prevalent or absent colors of the environment where a scan of the encoded scheme may take place, where each color-channel represents a bit of data, and where the number of color-channels can be three or more, four or more, six or more, eight or more, etc. (as there are no limitations imposed by human perceptibility), and by extension the number of encoded bits can be three or more, four or more, six or more, eight or more, etc.

In various embodiments, where four or more colors are used, each one of the four or more colors are distinct colors in relation to one another, and based on the colorspace techniques discussed herein and above, the four or more colors are derived from a plurality of coordinates corresponding to each one of the at least four distinct colors along a converted-to(derivative) colorspace, where the converted-to (derivative) colorspace contains a plurality of coordinates sets representing the at least four prevalent colors of the environment where a scan may take place, and each of the four or more colors corresponds to a distinct coordinate set of the converted-to (derivative) colorspace.

In various embodiments, each of the four or more distinct colors are selected based on having a maximal opposite coordinate relationship with respect to at least one of the plurality of coordinate sets representing at least four prevalent colors associated with the environment where a scan may take place.

The logic flow 500 may instruct any suitable printing device, such as printing device 199, to print the encoded scheme on a suitable medium 508, such as a physical page, a piece of paper, physical tape, or any other suitable medium. The printing may be any suitable printing technique, including utilizing high resolution 4k techniques and any suitable inks required for printing images pursuant to such a scheme. The logic flow 500A may instruct the suitable printing device to provide for at least 6-color-channels that may contain one bit of encoded data each, and one or more dummy color-channels with no data, in addition to an ultraviolet layer and an infrared layer, where each may contain a bit of data. In various embodiments, additional color-channels may be used to increase the amount of encoded data.

In various embodiments, the printing device may employ a chromabit column wise technique to print the encoded multimedia data on the physical medium, e.g. up to down, right, up to down, etc. In various embodiments, if tangential luminance information is not a standard A4 piece of paper and a standard 600 DPI printer are used, 4,960 pixels by 7,016 pixels may be printed on a piece of paper, where 4 pixels may represent a byte of data (2 by 2 dots), such that 4,960 by 7,016 pixels by 2 bytes corresponds to approximately 69,598, 720 bytes of data or approximately 69.6 mega-bytes (e.g. approximately sixty-nine mega-bytes) of encoded data on a single page (per sheet side, or 139.2 mega-bytes for double-sided pages), where the printed data may be scanned and detected as discussed herein or otherwise suitable.

In various embodiments, in addition to color-channels encoding information, a bit of information can be encoded in ultraviolet and/or infrared layers that are printed using ink with ultraviolet and/or infrared properties, such that at least six bits of data are associated with one or more distinct and different color-channels, and one bit of data corresponds to an ultraviolet layer and one bit of data corresponds to an infrared layer; where in at least one embodiment the printer will print the encoded scheme such that the top layer is the ultraviolet layer in order to fully take advantage of the properties associated with ultraviolet light.

In various embodiments, a portion of the printed material of the page can be directed to a luminance channel to encode tangential information, where the luminance channel portion may be associated with a larger amount of data and area on the page than any of the individual color-channels, ultraviolet channels, and/or infrared channels. In various embodiments, the printed scheme may be such that 16.9 mega-bytes of data re directed to the luminance channel, which may represent metadata, parity check information (such as a Hamming Code), page orientation information, and/or other data tangential to the encoded multimedia data, and the encoded multimedia data may represent approximately 50 mega-bytes of data on the page.

Accordingly, in various embodiments where the multimedia data is encoded data and compressed pursuant to an H.264 scheme, such that eight seconds of video data on a page at a 1280*720 at 24 fps video rate could be represented by 416 pages, or 208 pieces of paper that are double sided.

FIG. 6 illustrates one embodiment of a logic flow 600. The logic flow 600 may be representative of some or all of the operations executed by one or more embodiments described herein.

The logic flow 600 may instruct a suitable scanner, e.g. scanning device 197, to scan the printed scheme (as contained on any suitable medium, such as a piece of paper) containing encoded multimedia data (e.g. video data, audio data, image data, spatial data (which can create three-dimensional renderings), etc.) 615, where the encoded multimedia data may have been compressed prior to encoding and where the encoding is pursuant to a colorspace. Any suitable edge detection and/or scanning technique as discussed herein may or otherwise suitable may be used to carry out the scan.

The logic flow may instruct the suitable scanner, e.g. scanning device 197, and/or a suitable computer system, such as the system illustrated in FIG. 10f which the scanning device 197 is a part thereof, to decode the compressed encoded multimedia data 620. In various embodiments, the scanning device 197 and/or associated computer system in communication therewith, may have a suitable key, e.g., tristimulus equations associated with a conversion to an XYZ colorspace, that reveals the color-channels with associated colors that are associated with the scannable portions of the encoded scheme that contains information.

In various embodiments, the printed scheme may include four, six, or eight or more distinct colors each associated with at least four, six, or eight distinct color-channels, where each of the colors is different from one another and different from the most prevalent colors of the environment where a scan of the encoded scheme may take place. In various embodiments, the scanning device 197 may be configured to determine a color value of a color associated with color-channels defining the colorspace containing the encoded multimedia scheme, and if it meets a certain threshold, a bit value of the associated color-channel may be either a "1" or a "0." In various embodiments, the scanner may be configured with a verification instruction that an ultraviolet layer and/or infrared layer contains encoded information, and if ultraviolet and/or infrared light is reflected at a threshold level, then a bit value of "1" may be ascribed to either one or both of the ultraviolet and/or infrared channels, and if there the infrared and/or ultraviolet light reflects at a threshold below the threshold level, e.g. in the instance where no ultraviolet and/or infrared ink is used at all and this is intended to convey information, a "0" will be ascribed to that channel of information. In various embodiments, this may result in six bits of data associated with distinct and different color-channels and one bit of data associated with an infrared layer and/or ultraviolet layer, for a total of eight pits of data for a defined area on the physical page. Irrespective of the number of color-channels and/or infrared and/or ultraviolet layers, the scanning device 197 (in conjunction with a suitable computing device) may decode the information associated therewith, as outlined herein, and apply any suitable decompression technique corresponding to the compression technique (if applicable) used to compress the multimedia data prior to encoding, in order to obtain multimedia data encoded by the printed scheme.

In various embodiments, the logic flow 600 may instruct a decoding of luminance channel information associated with the physical medium containing the encoded multimedia data, where the luminance channel information may contain data tangential to the encode multimedia data, such as metadata, page orientation information, and/or a parity check function (Hamming Code). Any one of these pieces of information may be decoded prior, concurrent with, or after the decoding of the multimedia data, in order to ensure that the decoded multimedia information is properly processed and/or correct. For example, seven information channels of one or of color-channels, an ultraviolet channel, and/or an infrared layer may correspond to encoded multimedia information, and an eight bit may correspond to an odd parity check scheme, e.g. a Hamming Code, where a certain threshold of brightness may correspond to one value for the parity bit, e.g. "1," and below that threshold may correspond to another value, e.g. "0," where the parity bit may be used in any suitable manner to ensure the veracity and accuracy of the decoded information.

Figure 7:
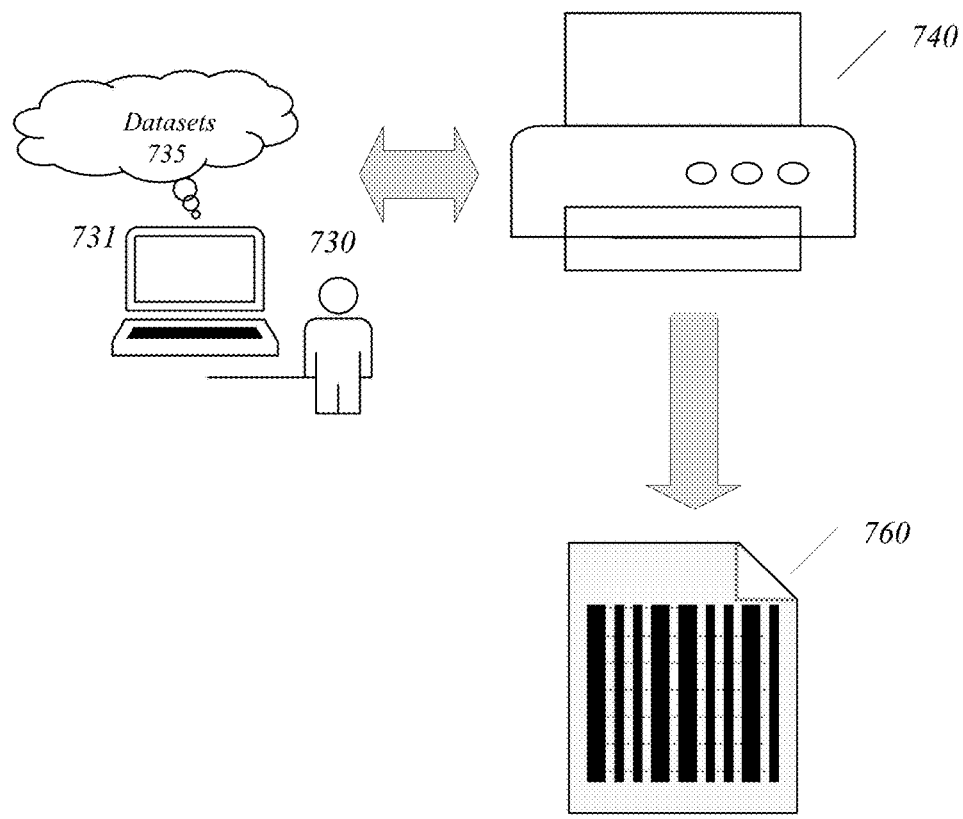
FIG. 7 illustrates a system for printing an encoded version of multimedia data or information in accordance with at least one embodiment of the present disclosure.

FIG. 7 illustrates a computer, laptop or tablet system 700 for generating and scanning a scannable image 740. The system 700 may include a computer device 731 that may be instructed by a user 730 to carry out one or more operations. The computer device 731 may include one or more of the components of the system as illustrated in FIG. 1 and/or it may contain one or more of the functions of the application as illustrated in FIG. 4 and/or it may implement one or more of the operations associated with either one or both of logic flow 500 and logic flow 600. In various embodiments, the computer device 731 may contain datasets 735, which may include one or more of image datasets, e.g. 172, and/or multimedia datasets data (e.g. video data, audio data, image data, spatial data (which can create three-dimensional renderings), etc.), e.g. 170. In various embodiments, the computer device 731 may perform one or more colorspace conversion and encoding techniques on the multimedia data associated with datasets 735, as discussed herein or otherwise suitable, and prepare an image scheme representing the encoded multimedia data based on the colorspace conversion and encoding techniques, where the encoding may include compressing the multimedia data for storage enhancement purposes prior to employing a colorspace encoding scheme.

Alternatively, the image data associated with the encoded multimedia data, e.g. patched image data 172, may be preloaded and part of datasets 735. In various embodiments, the computing device may instruct the printing device 740 to print the encoded multimedia scheme on one or more physical medium, e.g. paper pages 760 and where the printed scheme may include one or more color-channel layers, infrared layers, and/or ultraviolet layers contained multimedia data, and/or a luminance channel layer with encoded tangential information, such as metadata, page orientation information, or a parity check (Hamming code). In various embodiments, printing device 740 may be configured to contain and/or execute any applications and/or suitable operations associated with the computing device 73, including any relevant colorspace and encoding techniques, and in lieu of being associated or coordinating with another computer device, e.g. 731.

Figure 8:
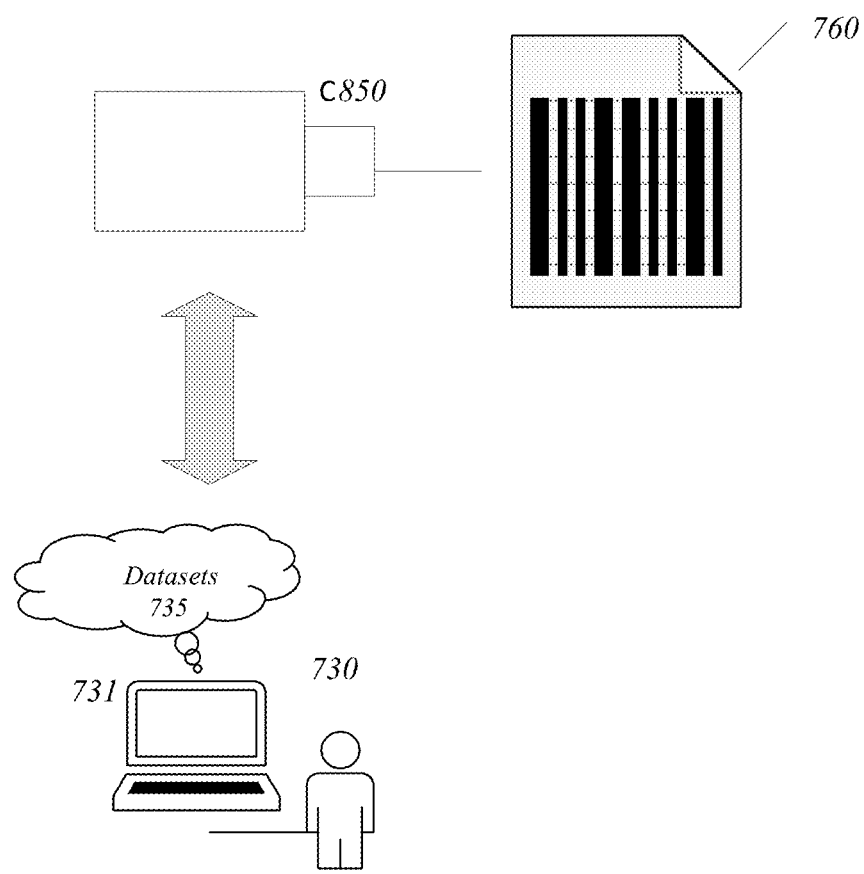
FIG. 8 illustrates a system for decoding an encoded version of multimedia data or information in accordance with at least one embodiment of the present disclosure

FIG. 8 illustrates a scanning system 800 for scanning the printed pages associated with FIG. 7. The system 800 may include a computer device 731 that may be instructed by a user 730 to carry out one or more operations. The computer device 731 may include one or more of the components of the system as illustrated in FIG. 1 and/or it may contain one or more of the functions of the application as illustrated in FIG. 4 and/or it may implement one or more of the operations associated with either one or both of logic flow 500 and logic flow 600. In various embodiments, the computer device 731 may contain datasets 735, which may include one or more of image datasets, e.g. 172, and/or multimedia datasets data (e.g. video data, audio data, image data, spatial data (which can create three-dimensional renderings), etc.), e.g. 170. In various embodiments, the computer device 731 may instruct scanning device c850 to scan one or more printed pages 760 using any suitable scanning technique, including any suitable edge detection technique as discussed herein. The scanning device may provide the scanned information to the computer device 730, where the computer device may decode the image data obtained from the one or more pages 760 using any suitable decoding technique as discussed herein, and where the printed scheme may include one or more color-channel layers, infrared layers, and/or ultraviolet layers contained multimedia data, and/or a luminance channel layer with encoded tangential information, such as metadata, page orientation information, or a parity check (Hamming code). In various embodiments, the decoding may include any decompression techniques required to decompress the multimedia data, if it was compressed prior to encoding, and where the decoding and decompression will result in access to the multimedia data. Alternatively, the encoded multimedia data may be preloaded and part of datasets 735. In various embodiments, scanning device c850 may be configured to contain and/or execute any applications and/or suitable operations associated with the computer device 730, including any relevant decoding operations, in lieu of being associated or coordinating with another computer device, e.g. 731.

Figure 9:
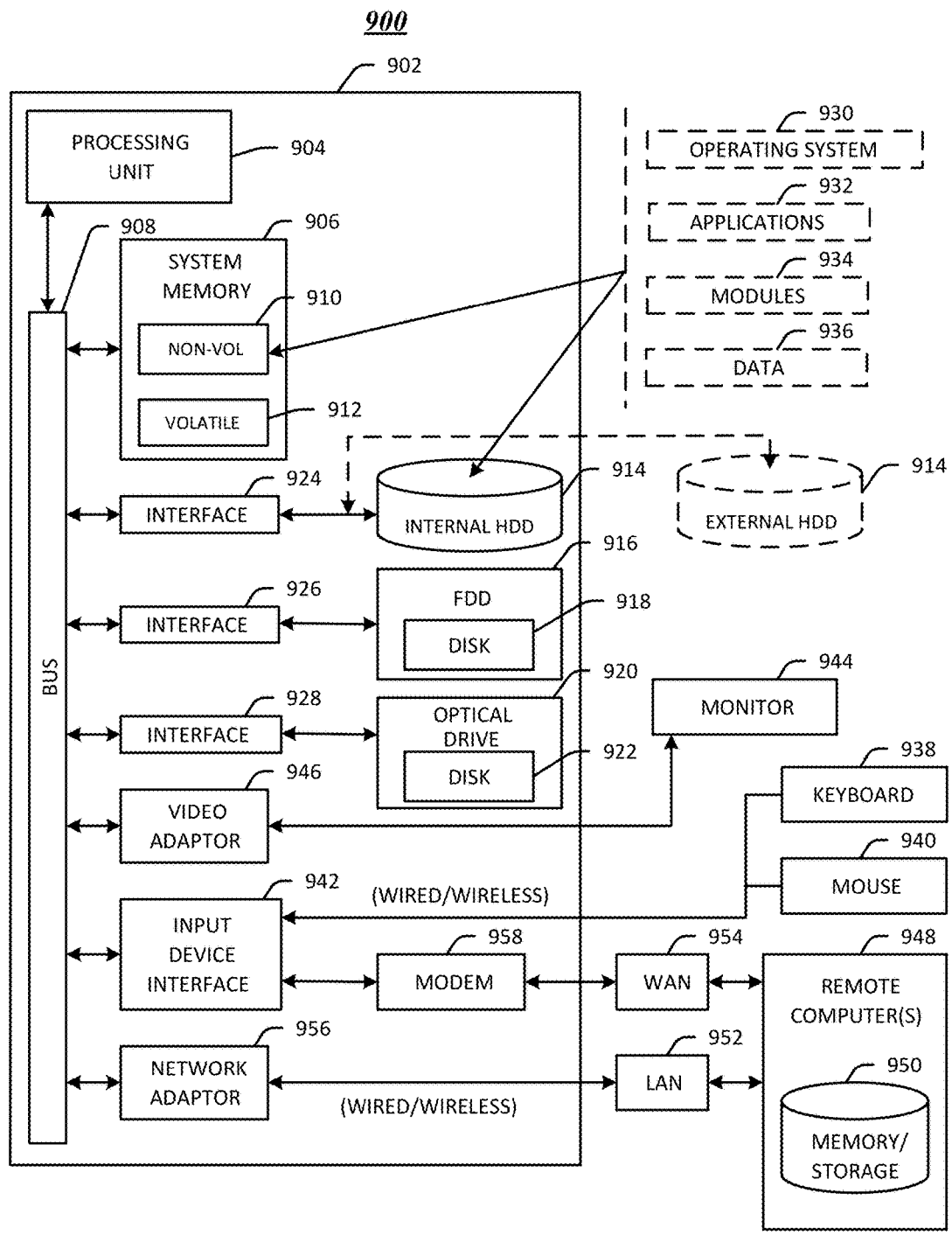
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 3, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multiprocessor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by an HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908 but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956. The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954 or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It may be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
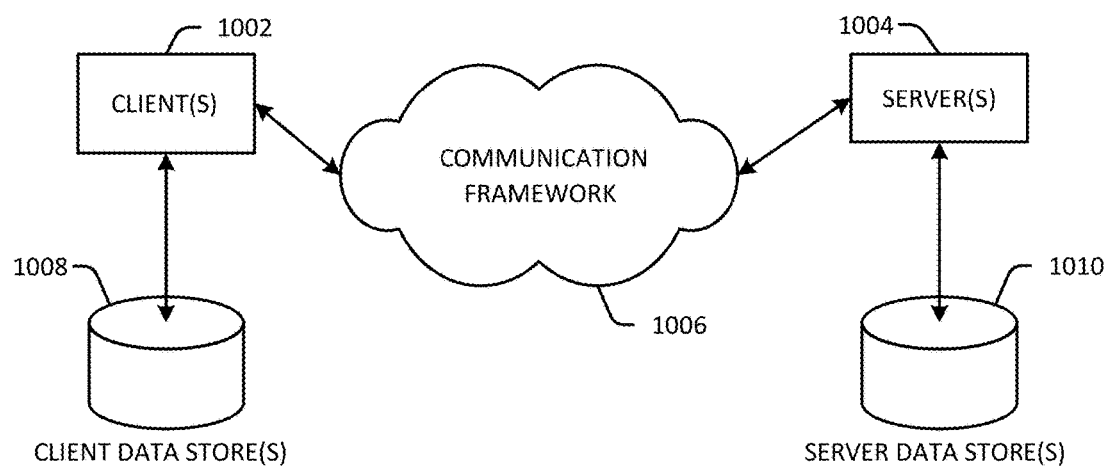
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client device 310. The servers 1004 may implement the server device 950. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. An apparatus, comprising:
a memory to store instructions;
processing circuitry, coupled with the memory, operable to execute the instructions, that when executed, cause the processing circuitry to:
  receive a multimedia dataset;
  compress the received multimedia dataset into a compressed data-packet;
  encode the compressed data-packet according to a colorspace, wherein the encoding is suitable for printing on a physical medium, wherein the colorspace is associated with a plurality of colors, and wherein the compressed data-packet is represented by each of the plurality of colors; and
  instruct a printing device to print the encoded data on the physical medium, wherein each of the plurality of colors representing the compressed data-packet is printed on the physical medium wherein the colorspace contains at least six color-channels, wherein each of the six color-channels is associated with at least one distinct color in relation to one another, and wherein each of the at least one distinct colors of the six color-channels is used to represent at least one bit of data of the encoded data-packet.

2. The apparatus of claim 1, wherein the multimedia data includes at least one of i) one or more text data, ii) one or more picture data, or iii) one or more video data, wherein the encoding of the compressed data-packet is such that is suitable for printing one on one or more physical pages, wherein the physical medium includes the one or more physical pages, and wherein the plurality of colors representing the compressed data-packet are represented as a plurality of pixels on the one or more physical pages.

3. The apparatus of claim 2, wherein the one or more physical pages are one or more pieces of paper.

4. The apparatus of claim 3, wherein the processing circuitry is further caused to:
  instruct a scanner to scan the one or more pieces of paper; and
  decode the compressed data-packet from the one or more pieces of paper.

5. The apparatus of claim 4, wherein the decoding is based on the colorspace.

6. The apparatus of claim 2, wherein each of the plurality of pixels is represented by a color associated with each of the at least six color-channels.

7. The apparatus of claim 6, wherein at least a portion of the compressed data-packet is represented by at least one of i) an infrared channel or ii) an ultraviolet channel, wherein the at least one of i) the infrared channel or ii) the ultraviolet channel is represented by a portion of the plurality of pixels, and wherein the portion of the plurality of pixels associated with the at least one of i) the infrared channel or ii) the ultraviolet channel is printed with an ink that can reflect or absorb one or both of i) infrared light and ii) ultraviolet light.

8. The apparatus of claim 7, wherein the portion of the plurality of pixels is represented by both of the infrared channel and the ultraviolet channel.

9. The apparatus of claim 8, wherein at least one of i) at least one of the at least six color-channels, ii) the infrared channel, or iii) the ultraviolet channel represents an error correcting code.

10. The apparatus of claim 9, wherein the error correcting code is a Hamming code.

11. The apparatus of claim 10, wherein the Hamming code is represented by either one or both of i) the infrared channel and ii) the ultraviolet channel, and wherein each one of the one or more pieces of paper contains at least fifty megabytes of data in addition to data representing the error correcting code.

12. A method comprising:
- scanning one or more physical pages containing compressed data, wherein the compressed data is encoded on the one or more physical pages pursuant to a colorspace, wherein the colorspace is associated with a plurality of color-channels, wherein each one of the plurality of color-channels is associated with at least one color, and wherein the compressed data represents a multimedia dataset; and
- decoding the compressed data, wherein the decoding is pursuant to the colorspace, wherein the colorspace contains at least six color-channels, wherein each of the six color-channels is associated with at least one distinct color in relation to one another, and wherein each of the at least one distinct colors of the six color-channels is used to represent at least one bit of data of the compressed data.

13. The method of claim 12, wherein the multimedia set represents at least one of i) one or more text data, ii) one or more picture data, or iii) one or more video data, wherein the one or more physical pages are one or more pieces of paper, wherein the compressed data is represented as a plurality of pixels on the one or more pieces of paper, and wherein each of the plurality of pixels is represented by at least one color from each of the plurality of color-channels.

14. The method of claim 13, wherein the one or more pieces of paper each contain at least sixty-nine mega-bytes of readable data.

15. The method of claim 13, wherein at least a portion of the compressed data is represented by at least one of i) an infrared channel or ii) an ultraviolet channel, wherein the at least one of i) the infrared channel or ii) the ultraviolet channel is represented by a portion of the plurality of pixels, and wherein the portion of the plurality of pixels associated with the at least one of i) the infrared channel or ii) the ultraviolet channel is printed with an ink that can reflect or absorb one or both of i) infrared light and ii) ultraviolet light.

16. The method of claim 15, wherein the portion of the plurality of pixels is represented by both of the infrared channel and the ultraviolet channel.

17. The method of claim 16, wherein at least one of i) the infrared channel or ii) the ultraviolet channel represents an error correcting code, and wherein the method further comprises:
- scanning the infrared channel and the ultraviolet channel; and
- performing a parity check to detect an error associated with the decoding of the compressed data, wherein the parity check is based on the scanning of the infrared channel and the ultraviolet channel.

18. An article of manufacture comprising:
- a sheet of paper;
- a plurality of colors printed on the sheet of paper and based on a colorspace with six or more color-channels, each of the six or more color-channels containing at least one distinct color in relation to one another, and wherein each one of the at least one distinct colors is represented in the plurality of colors; and
- at least one of an ultraviolet channel or an infrared channel represented and detectable by a pattern of ink on the sheet of paper,
- wherein the pattern of ink can absorb or reflect at least one ultraviolet light or infrared light, wherein each one of the plurality of colors represents at least one bit of data of a compressed data-packet, wherein the compressed data-packet represents a multimedia dataset, wherein the at least one of the ultraviolet channel or the infrared channel represents an error correcting code in relation to the compressed data-packet, and wherein the sheet of paper contains at least one additional data representing the error correcting code.

\* \* \* \* \*